(12) United States Patent
Cohen et al.

(10) Patent No.: US 7,420,564 B2
(45) Date of Patent: *Sep. 2, 2008

(54) SHAPE AND ANIMATION METHODS AND SYSTEMS USING EXAMPLES

(75) Inventors: Michael F. Cohen, Seattle, WA (US); Charles F. Rose, III, Redmond, WA (US); Peter-Pike Sloan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 195 days.

This patent is subject to a terminal disclaimer.

(21) Appl. No.: 11/118,687

(22) Filed: Apr. 29, 2005

(65) Prior Publication Data

US 2005/0270295 A1 Dec. 8, 2005

Related U.S. Application Data

(63) Continuation of application No. 09/627,147, filed on Jul. 21, 2000, now Pat. No. 7,091,975.

(51) Int. Cl.
G06T 15/70 (2006.01)
(52) U.S. Cl. ............... 345/473; 345/949; 345/956
(58) Field of Classification Search ........... 345/473, 345/419, 946, 956
See application file for complete search history.

(56) References Cited

U.S. PATENT DOCUMENTS

| | | | | |
|---|---|---|---|---|
| 5,416,899 A | * | 5/1995 | Poggio et al. | 345/475 |
| 5,454,043 A | * | 9/1995 | Freeman | 382/168 |
| 5,513,303 A | * | 4/1996 | Robertson et al. | 345/419 |
| 560,017 A | * | 5/1997 | Gasper et al. | 704/276 |
| 5,644,694 A | * | 7/1997 | Appleton | 345/474 |
| 5,649,086 A | * | 7/1997 | Belfer et al. | 345/441 |
| 5,684,942 A | * | 11/1997 | Kimura | 345/473 |
| 5,766,016 A | * | 6/1998 | Sinclair et al. | 434/262 |
| 6,025,852 A | | 2/2000 | Zhao | |
| 6,057,859 A | * | 5/2000 | Handelman et al. | 345/474 |

(Continued)

OTHER PUBLICATIONS

Performance-driven hand-drawn animation Ian Buck, Adam Finkelstein, Charles Jacobs, Allison Klein, David H. Salesin, Joshua Seims, Richard Szeliski, Kentaro Toyama Jun. 2000 Proceedings of the 1st international symposium on Non-photorealistic animation and rendering NPAR '00 Publisher: ACM Press.*

(Continued)

*Primary Examiner*—J. Amini
(74) *Attorney, Agent, or Firm*—Lee and Hayes, PLLC

(57) ABSTRACT

Shape animation is described. In one aspect, examples that pertain to a shape or motion that is to be animated are provided. The examples are placed within a multi-dimensional abstract space. Each dimension of the abstract space is defined by at least one of an adjective and an adverb. A point within the multi-dimensional abstract space is selected. The selected point does not coincide with a point that is associated with any of the examples. The selected point corresponds to a shape or motion within the abstract space. A single weight value for each of the examples is computed. The single weight values for each of the examples are combined in a manner that defines an interpolated shape or motion that is a blended combination of each of the examples of the set of examples.

18 Claims, 14 Drawing Sheets
(7 of 14 Drawing Sheet(s) Filed in Color)

U.S. PATENT DOCUMENTS

| | | | | |
|---|---|---|---|---|
| 6,115,052 | A | * | 9/2000 | Freeman et al. ............ 345/473 |
| 6,118,459 | A | * | 9/2000 | Hunter ....................... 345/474 |
| 6,124,864 | A | * | 9/2000 | Madden et al. ............ 345/473 |
| 6,128,631 | A | * | 10/2000 | Wallace et al. ............. 715/502 |
| 6,169,534 | B1 | * | 1/2001 | Raffel et al. ................ 345/581 |
| 6,188,776 | B1 | * | 2/2001 | Covell et al. ................ 382/100 |
| 6,191,798 | B1 | * | 2/2001 | Handelman et al. ......... 345/473 |
| 6,208,360 | B1 | * | 3/2001 | Doi et al. .................... 345/474 |
| 6,288,727 | B1 | * | 9/2001 | Akemann .................. 345/473 |
| 6,307,562 | B1 | * | 10/2001 | Taivalsaari ................. 345/473 |
| 6,369,821 | B2 | * | 4/2002 | Merrill et al. ............... 345/473 |
| 6,384,819 | B1 | * | 5/2002 | Hunter ....................... 345/418 |
| 6,426,750 | B1 | * | 7/2002 | Hoppe ....................... 345/428 |
| 6,456,289 | B1 | * | 9/2002 | O'Brien et al. ............. 345/473 |
| 6,459,808 | B1 | * | 10/2002 | Brand ........................ 382/155 |
| 6,459,824 | B1 | * | 10/2002 | Lee et al. .................... 382/305 |
| 6,462,742 | B1 | * | 10/2002 | Rose et al. .................. 345/473 |
| 6,492,990 | B1 | * | 12/2002 | Peleg et al. ................. 345/473 |
| 6,552,729 | B1 | * | 4/2003 | Di Bernardo et al. ....... 345/473 |
| 6,735,566 | B1 | * | 5/2004 | Brand ........................ 704/256 |
| 7,084,874 | B2 | * | 8/2006 | Kurzweil .................... 345/473 |
| 7,196,702 | B1 | * | 3/2007 | Lee et al. .................... 345/419 |
| 2003/0231181 | A1 | * | 12/2003 | Rose et al. .................. 345/473 |
| 2004/0085311 | A1 | * | 5/2004 | Lee et al. .................... 345/419 |
| 2005/0190204 | A1 | * | 9/2005 | Cohen et al. ................ 345/660 |

OTHER PUBLICATIONS

Computer Graphics, Keith Walters, A muscle Model for animating three-dimensional facial expression, Jul. 1987, vol. 21, No. 4, pp. 17-24.

Computer Graphics, Stephen M. Platt, Animating Facial Expressions, Aug. 1981, vol. 15, No. 3, pp. 245-252.

David E. DiFranco, Reconstrcutions of 3-D figure motion from 2-D correspondences, 2001 IEEE, pp. I-307-I-314.

Henry A. Rowley, Analyzing Articulated Motion Using Expectation-Maximization, IEEE, 1997, pp. 935617.

Hybrid anatomically based modeling of animals Schneider, P.J.; Wilhelms, J.; Computer Animation 98, Proceedings, Jun. 8-10, 1998 pp. 161-169.

Muscle modeling for facial animation in videophone coding, Braccini, C.; Curinga, S.; Grattarola, A.A.; Lavagetto, F.; Robot and Human Communication, 1992, Proceedings, IEEE International Workshop on Sep. 1-3, 1992, pp. 369-374.

Skin aging estimation by facial stimulation Yin Wu; Pierre Beylot, Magnenat Thalmann, N.; Computer Animation, 1999, Proceedings, May 26-29, 1999 pp. 210-219.

Facial animation Dubreuil, N.; Bechmann, D.; Computer Animation '96, Proceedings, Jun. 3-4, 1996 pp. 98-109.

Modeling, tracking and interactive animation of faces and heads/ using input from video Essa, I; Basu, S.; Darrell, T.; Pentland, A.; Computer Animation '96, Proceedings, Jun. 3-4, 1996 pp. 68-79.

Accessible animation and customizable graphics via simplicial configuration modeling Tom Ngo, Doug Cutrell, Jenny Dana, Bruce Donald, Lorie Loeb, Shunhui Zhu Jul. 2000.

Performance-driven hand-drawn animation Ian Buck, Adam Finkelstein, Charles Jacobs, Allison Klein, David H. Salesin, Joshua Seims, Richard Szeliski, Kentaro Toyama Jun. 2000.

A biologically inspired robotic model for learning by imitation Aude Billard, Maja J. Mataric Jun. 2000.

Lewis et al., "Pose Space Deformation: A Unified Approach to Shape Interpolation and Skeleton-Driven Deformation", ACM, 2000, pp. 165-173.

Norman, et al., "Animation Control for Real-Time Virtual Humans", ACM, vol. 42, No. 8, 1999, pp. 65-74.

Powell, M.J.D. "Radial Basis Functions for Multivariable Interpolation: A Review", Algorithms for Approximation, Oxford University Press, Oxford, UK, 1987, pp. 143-167.

rad, N. et al. "Image Warping by Radial Basis Functions: Application to Facial Expressions", Computer Vision, Graphics, and Image Processing: Graphical Models and Image Processing, 56, Mar. 2, 1994, pp. 161-172.

"Visual Modeling for Computer Animation: Graphics with a Vision", Nov. 1999 pp. 1-4.

* cited by examiner

SHAPE AND ANIMATION METHODS AND SYSTEMS USING EXAMPLES

RELATED APPLICATION

This patent application is a continuation under 37 CFR 1.53(b) of and commonly owned U.S. patent application Ser. No. 09/627,147, titled "Shape and Animation Methods and Systems Using Examples", filed on Jul. 21, 2000, now U.S. Pat. No. 7,091,975 and incorporated by reference.

TECHNICAL FIELD

This invention relates to the fields of computer graphics and computer animation. More particularly, the invention concerns methods and systems for creating or blending animated forms and/or motions.

BACKGROUND

Modern animation and modeling systems enable artists to create high-quality content, but provide limited support for interactive applications. Although complex forms and motions can be constructed either by hand or with motion or geometry capture technologies, once they are created, they are difficult to modify, particularly at runtime.

The magic of computer graphics as seen in many current movies and computer games comes at a cost. Creating geometric forms that are used to generate synthetic characters, and animating the characters to bring them to life requires either highly skilled artists and/or sophisticated capture devices. Both are expensive and, in the case of highly skilled artists, rare.

At this time, a variety of 3D scanning methodologies are available that can capture shapes that exist in the real world. Motion capture technologies are also capable of recording complex performances. One drawback of these capture systems is the cost that is incurred in their purchase and operation. Another limitation of capture devices is that they are restricted to recording shapes and motions that can be observed and that actually exist (e.g., such systems cannot capture the motion of a dinosaur). In contrast to the scanning devices, highly skilled artists have the advantage of being able to model complex existing shapes, as well as imaginary shapes and animations.

Both of these means of creating shapes and animations are limited in the same way. In particular, neither has a simple means of automatically modifying the shapes and animations once they have been created. It would be highly desirable for current systems to be able to automatically modify a shape or animation for two reasons. First, in scripted settings, such as films, automatic modification makes it easier to avoid redundancy. For instance, an entire colony of different looking ants could be automatically created from a few distinct ants. In addition, the ants' motion could automatically adapt to changes in their mood or to the terrain they are walking on. Second, in non-scripted interactive runtime settings, such as games, it is not possible to anticipate all shapes and animations that will be needed when the game is played. Thus, most games simply try to reuse the closest fitting model or motion for the situation. One solution to the above problems is to create more shapes and animations. Unfortunately, this approach is very costly.

Accordingly, this invention arose out of concerns associated with improving modern animation and modeling systems.

SUMMARY

Shape animation is described. In one aspect, examples that pertain to a shape or motion that is to be animated are provided. The examples are placed within a multi-dimensional abstract space. Each dimension of the abstract space is defined by at least one of an adjective and an adverb. A point within the multi-dimensional abstract space is selected. The selected point does not coincide with a point that is associated with any of the examples. The selected point corresponds to a shape or motion within the abstract space. A single weight value for each of the examples is computed. The single weight values for each of the examples are combined in a manner that defines an interpolated shape or motion that is a blended combination of each of the examples of the set of examples.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

Overview

Modern animation and modeling systems enable artists to create high-quality content, but provide limited support for interactive applications. Although complex forms and motions can be constructed either by hand or with motion or geometry capture technologies, once they are created, they are difficult to modify, particularly at runtime.

Interpolation or blending provides a way to leverage artist-generated source material. Presented here are methodologies for efficient runtime interpolation between multiple forms or multiple motion segments. Radial basis functions provide key mathematical support for the interpolation. Once the illustrated and described system is provided with example forms and motions, it generates a continuous range of forms referred to as a "shape" or a continuous range of motions referred to as a verb.

Additionally, shape interpolation methodology is applied to articulated figures to create smoothly skinned figures that deform in natural ways. The runtime interpolation of the forms or motions runs fast enough to be used in interactive applications such as games.

Exemplary Operating Environment

Figure 1:
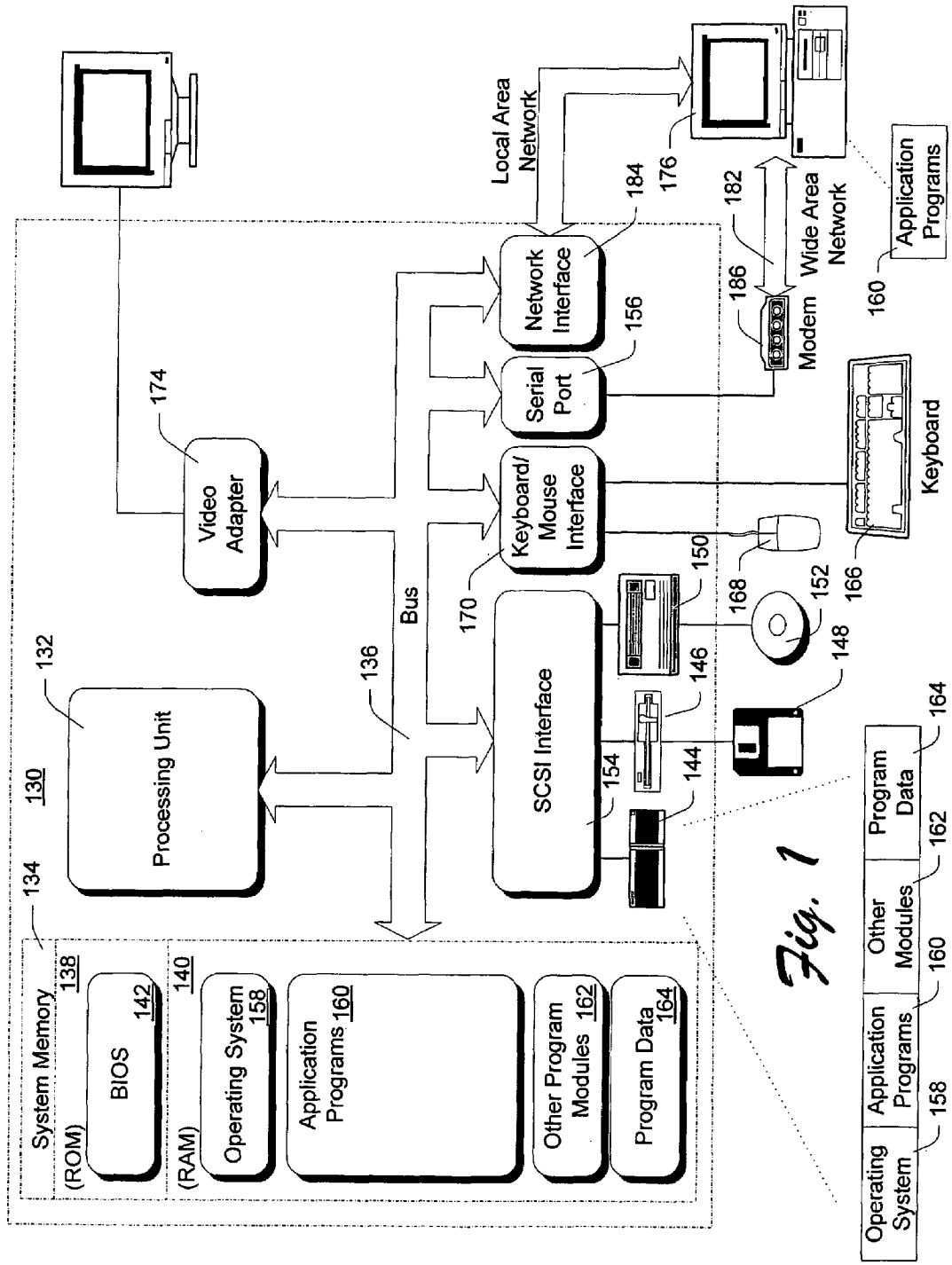
FIG. 1 is a block diagram of an exemplary computer system that is suitable for use with the described embodiments.

FIG. 1 is a high level block diagram of an exemplary computer system 130 in which the described embodiments can be implemented. Various numbers of computers such as that shown can be used in the context of a distributed computing environment. These computers can be used to render graphics and process images in accordance with the description given below.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary System

Figure 2:
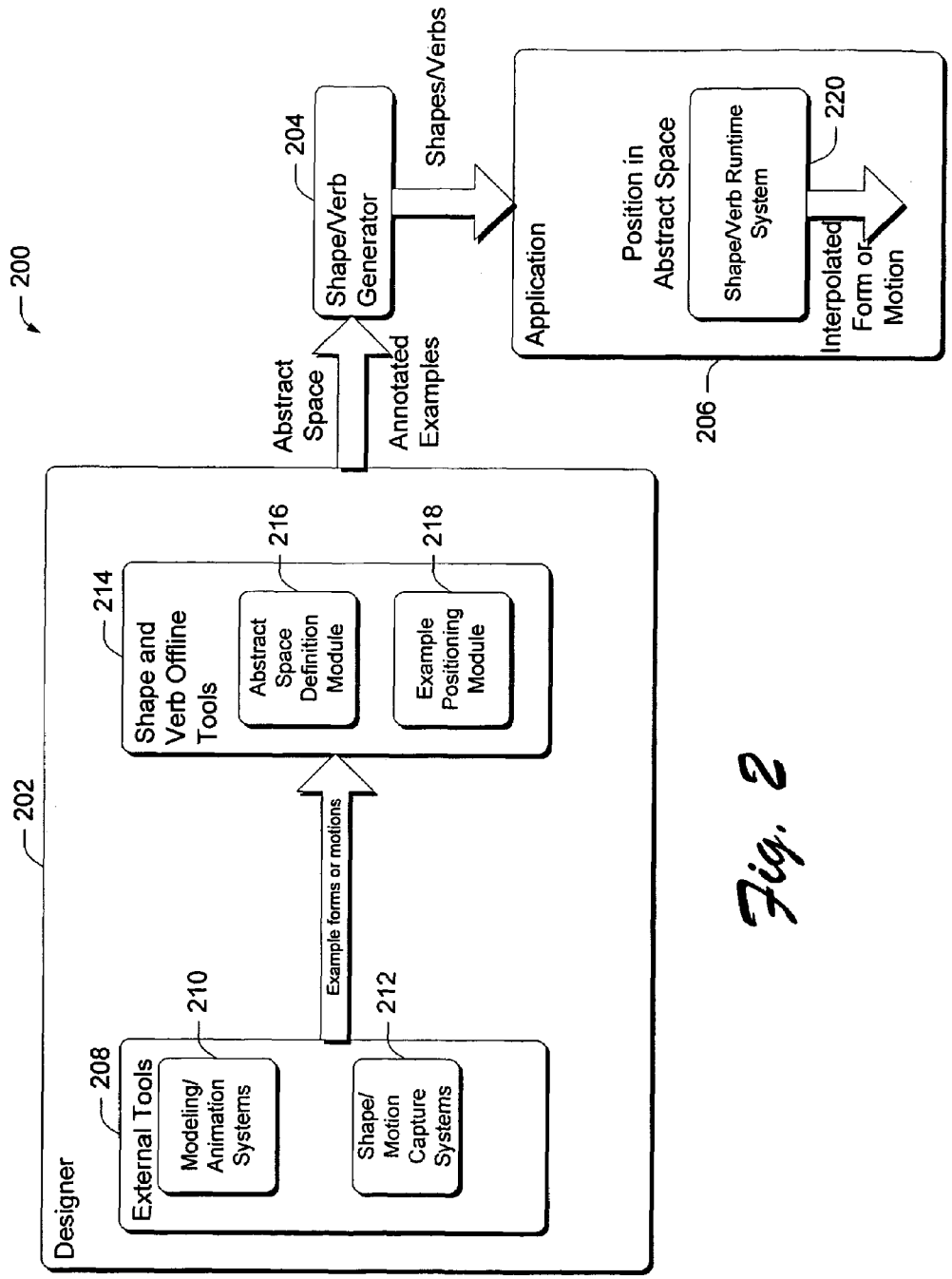
FIG. 2 is a block diagram of an exemplary system in which the inventive methodologies can be employed.

FIG. 2 shows an exemplary system 200 in which the inventive methodologies discussed below can be employed. In the discussion immediately below, the system's components are first identified followed by a discussion of their functionality.

System Components

In the illustrated example, system 200 comprises a designer component 202, a shape/verb generator 204, and an exemplary application 206. One primary focus of system 200 is to provide a way, in an application, to have a very lightweight, fast runtime system that allows for modification of a shape or animation on the fly in the context of the application (which can typically comprise a game).

Designer component 202 comprises an external tools module that can include, among other components, modeling/animation systems 210 and shape/motion capture systems 212. The designer component also comprises various shape and verb offline tools 214 that comprise an abstract space definition module 216 and an example position module 218 that positions examples in abstract space.

Application 206 comprises a shape/verb runtime system 220 that is embedded in an application, such as a game, that uses the system described below to drive the animation of a character. The inventive aspects that are about to be described pertain to the shape and verb offline tools 214, shape/verb generator 204, and the shape/verb runtime system 220.

System Component Functionality

Typically, a designer relies on external modeling and animation systems and/or geometry and motion capture technology (external tools 208) to create initial forms and motions. In the context of this document, these initial forms and motions are referred to as example forms and example motions, or simply "examples". As an illustration, consider an object that has a shape. One way of capturing the object's shape might be to project structured light onto the object so that a camera and computer can record the object's shape. This shape is digitized and can then be used in graphics applications. For a situation that involves motion, a person might be outfitted with a number of reflectors and then filmed so that a computer can capture their motion. In each of the these systems, once the images are captured they are very difficult to modify. In a traditional system, these captured images from externals tools 208 would flow directly to an application that would simply pull out the captured images and run them as appropriate in known ways.

In the illustrated and described embodiment, shape and verb offline tools 214 enable the designer to organize these example forms or motions that serve as input into shape and verb generator 204. To do so, the designer can choose a set of adjectives that characterize the forms or a set of adverbs that characterize the motions. The adjectives or adverbs define an abstract space and each adjective or adverb represents a separate axis in this abstract space. For instance, adjectives that describe the form of a human arm may include gender, age, and elbow bend. These adjectives are used to define the axes in an abstract space.

Figure 3:
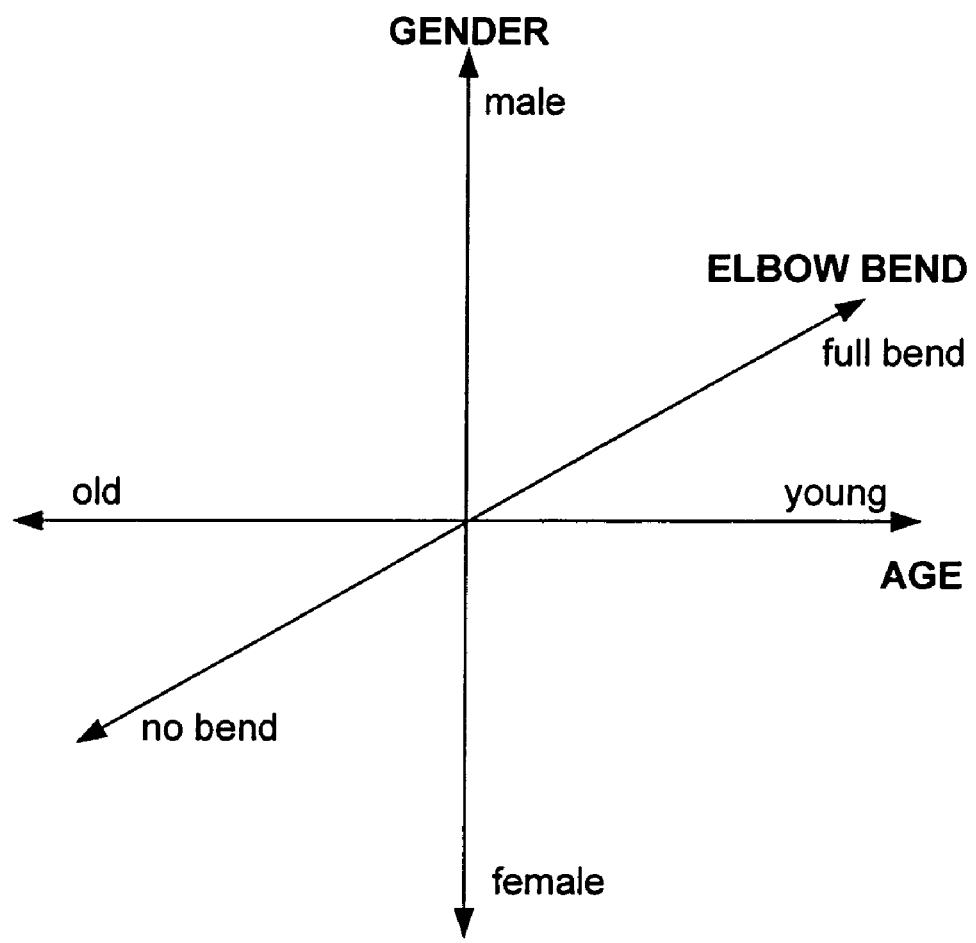
FIG. 3 is a diagram that illustrates an exemplary abstract space and is useful in understanding some of the concepts behind the inventive embodiments.

Consider FIG. 3, for example. There, each of the adjectives is seen to define an axis in the abstract space. The adjective "gender" can range in values from male to female; the adjective "age" can range in values from old to young; and the adjective "elbow bend" can range in value from no bend to full bend. These axes are of interest because the form of a human arm changes depending on whether it belongs to a male or female, or whether the person is old or young. The arm also deforms when the skeleton bends. In the latter case, deformation does not refer to the rigid body transformations induced by, for instance, bending the elbow, but rather the more subtle non-rigid changes in muscles and skin.

Adverbs for a walk may include the walker's mood and aspects of the environment in which the walk takes place. A happy walk is quite different from a sad or angry walk. Walks also differ with the slope or the surface walked on.

Once the designer has defined the abstract space using shape and verb offline tools 214 (FIG. 2), each example form or motion is annotated with its location in the abstract space. Annotation of an example's location in the abstract space is a mathematical characterization of the example's location. In addition, motion examples can be tagged with so-called keytimes, such as the moment when each foot touches the ground. The keytimes provide a means to perform automatic time warping at runtime. Details of the time warping can be found in Rose et al, *Verbs and Adverbs: Multidimensional motion interpolation,* IEEE Computer Graphics and Applications 18, 5 (September 1998), pps. 32-40.

Based on the annotated examples and the abstract space, shape and verb generator 204 solves for the coefficients of a smoothly-varying interpolation of the forms and motions across the abstract space. These coefficients provide the means to interpolate between the example forms and motions at runtime. In the context of this document, the output produced by the shape and verb generator 204 is referred to as a "shape" when interpolating forms, and as a "verb" when interpolating motions.

At runtime, application 206 chooses, at each moment in time, desired values for the adjectives or adverbs, thus defining a specific location in the abstract space. For instance, a character can be set to be happy or sad or anywhere in between; an arm can be specified to be more male or female, or to respond to the bending of the elbow. The shape and verb runtime system 220 then responds to the selected location in the abstract space by efficiently blending the annotated examples to produce an interpolated form or motion.

The number of adverbs or adjectives defines the dimension of the abstract space. In this document, D is used to denote the dimension. The number of examples included in a construction of a shape or verb are denoted by N. Each motion in a verb as well as each form in a shape is required to have the same structure. That is, all forms in a shape must have the same number of vertices with the same connectivity. Since example forms must all have the same topological structure, we do not need to address the correspondence problem here. Examples must each define the same set of DOFs, but may do so in a variety of ways. Different curve representations, number of control points, etc., can all coexist within a single set of examples. All example motions in a particular verb must also represent the same action. A set of example walks, for instance, must all start out on the same foot, take the same number of steps, and have the same arm swing phase. Thus, all examples (forms or motions) must have the same number of degrees of freedom (DOFs). The number of DOFs, denoted M, equals three times the number of vertices in a form (for the x, y, z coordinates). In the case of a motion, the number of DOFs is the number of joint trajectories times the number of control points per curve.

In the discussion that follows, a number of different symbols are used to mathematically describe and illustrate the inventive approach. The table just below summarizes or explains these symbols.

| Object | Variable | Subscript | Range |
|---|---|---|---|
| Example | X | i | 1...N |
| DOF | x | i | 1...N |
|  |  | j | 1...M |
| Point in Adverb Space | p | i |  |
| Radial basis | R | i |  |
| Radial Coefficient | r | i, j |  |
| Linear Basis | A | l | 0...D |
| Linear Coefficient | a | i, l |  |
| Distance | d | i |  |

Consider that an example is a collection of numbers that numerically describe the DOFs. For instance, a shape is composed of many vertices and triangles. Each vertex can be considered as three numbers and there may be a few hundred vertices that describe a shape. Typically, there may be a few thousand numbers that are associated with each example and that describes the example. With respect to motion, such is analogously described by a collection of numbers that might define, for example, the motion of an arm during a defined period of time. An example is denoted mathematically as $X_i$, where:

$$X_i = \{x_{ij}, p_i, K_m : i=1 \ldots N, j=1 \ldots M, m=0 \ldots \text{NumKeyTimes}\}$$

Each $x_{ij}$, the $j^{th}$ DOF for the $i^{th}$ example represents a coordinate of a vertex or, in the case of a motion, a uniform cubic B-spline curve control point. $p_i$ is the location in the abstract space assigned to the example. K is the set of keytimes that describe the phrasing (relative timing of the structural elements) of the example in the case of a motion. Based on the keytime annotations for each motion example, the curves are all time-warped into a common generic time frame. Keytimes are, in essence, additional DOFs and are interpolated at runtime to undo the time-warp. See Rose et al., referenced above, for details on the use of keytimes.

Shape and Verb Generation

Given a set of examples (i.e. shapes or motions), the challenge is to ascertain mathematically how a non-example shape or motion is going to look. Recall that the non-example shape or motion constitutes a shape or motion that was not defined by a designer. In the illustrated and described embodiment, a set of weights is developed for a particular point in the abstract space. The particular point represents a point that is not an example and for which a shape or motion is to be derived. The set of weights for that point consists of a weight value for each example. The individual weight values are then blended together to define the shape or motion at the given point.

Figure 4:
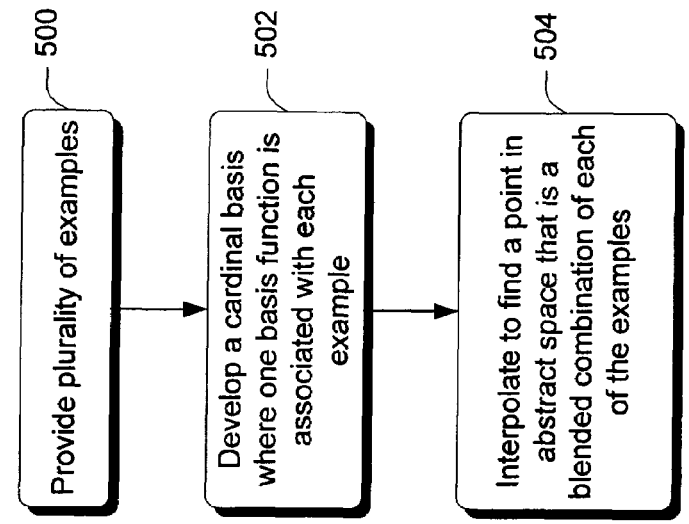
FIG. 4 is a flow diagram that describes steps in a method in accordance with the described embodiments.

FIG. 4 is a flow diagram that describes steps in a method in accordance with the described embodiment. The method can be implemented in any suitable hardware, software, firmware, or combination thereof. In the illustrated example, the method is illustrated in software. Step 400 provides a point in an abstract space for which a form or motion is to be defined. The abstract space is populated with examples, as described above. Step 402 develops a set of weights or weight values for that particular point based upon the predefined examples that populate the abstract space. That is, for each example, a weight value is derived. Step 404 then combines the individual weights and their corresponding examples to define a shape or motion for the point of interest. In the illustrated and described embodiment, each weight value is used to adjust all of the corresponding coefficients of an example that define that example. This constitutes an improvement over past methods, as will be described in more detail below.

That is, given a set of examples, a continuous interpolation over the abstract space is generated for the shape or verb. The goal is to produce, at any point p in the abstract space, a new motion or form X(p) that is derived through interpolation of the examples. When p is equal to the position $p_i$ for a particular example i, then X(p) should equal $X_i$. In between the examples, smooth intuitive changes should take place.

In Rose et al., referenced above, each B-spline coefficient was treated as a separate interpolation problem (e.g. 1200 separate problems in their walk verb) which leads to inefficiencies. In the illustrated and described embodiment, a cardinal basis is developed where one basis function is associated with each example. As a cardinal basis, each basis function has a value of 1 at the example location in the abstract space and a value of 0 at all other example locations. This specification guarantees an exact interpolation. For each DOF, the bases are simply scaled by the DOF values and then summed. This approach is more efficient than the approach set forth in Rose et al. in the case of animations and, the approach can be applied to shape interpolation.

Figure 5:
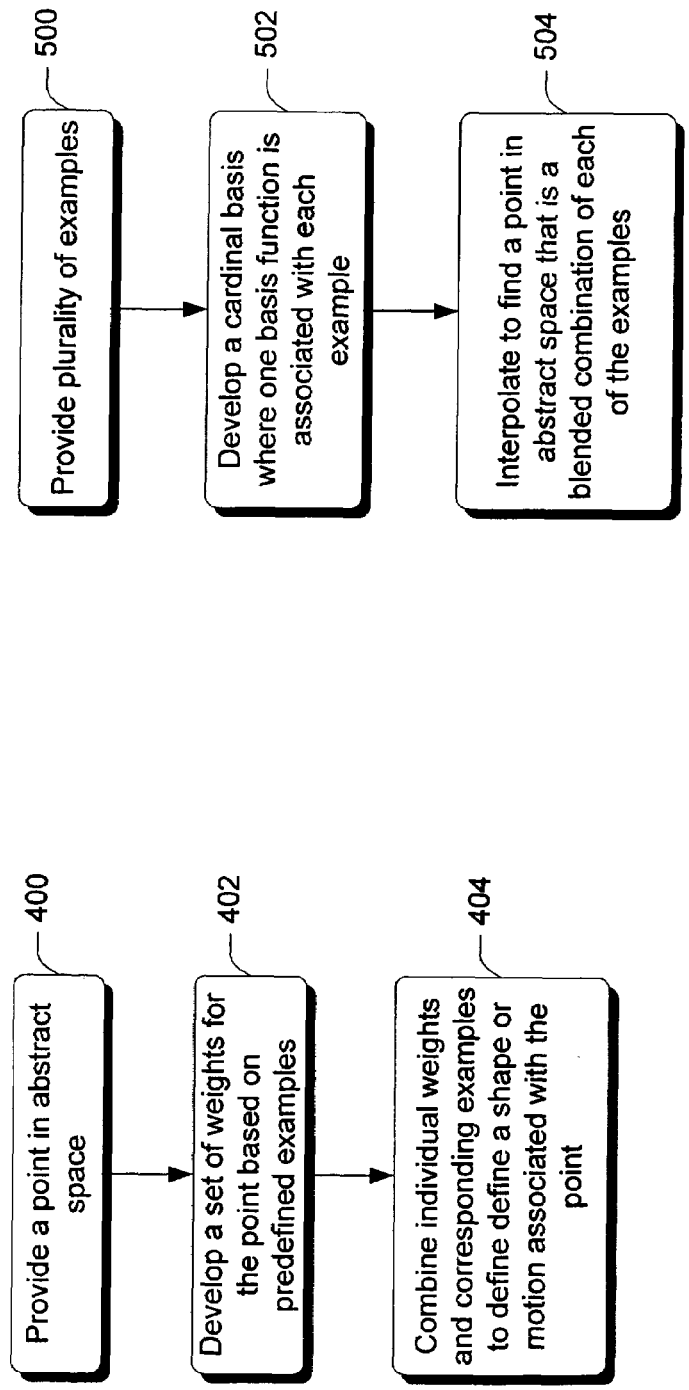
FIG. 5 is a flow diagram that describes steps in a method in accordance with the described embodiments.

FIG. 5 is a flow diagram that describes steps in a method in accordance with the described embodiment. The steps can be implemented in any suitable hardware, software, firmware, or combination thereof. In the illustrated example, the steps are implemented in software. Step 500 provides a plurality of examples. These examples can be generated by designers as described above. Step 502 develops a cardinal basis where one basis function is associated with each example. Step 504 then interpolates to find a point in abstract space that is a blended combination of each of the examples provided in step 500.

One specific example of how this can be done is described below. It will be appreciated that the specific example constitutes but one way of implementing the described embodiment. Other ways of implementing the described embodiment can be used without departing from the spirit and scope of the claimed subject matter.

Selecting Cardinal Basis Function Shapes

In the illustrated example, a specific shape of the individual cardinal basis functions is selected. In the present situation, the problem is essentially one of scattered data interpolation, as we have few data points, the examples, in a relatively high dimensional space. Most published scattered data interpolation methods focus on one and two-dimensional problems. Linear interpolation using Delauney triangulation, for instance, does not scale well in high dimensions. Based on the present need to work in high dimensions with very sparse samples, an approach is adopted which is a combination of radial basis functions and low order (linear) polynomials.

For a given point in abstract space, the defined cardinal basis gives the weight values for each of the examples that are to be used to define the shape or motion for the point in abstract space. The specific cardinal basis that was used in experimentation has the form:

$$w_{i_1}(p) = \sum_{i_2=1}^{N} r_{i_2 i_1} R_{i_2}(p) + \sum_{l=0}^{D} a_{i_1 l} A_l(p) \qquad \text{Equation 1}$$

where $r_{i_2 i_1}$ and $R_i$ are, respectively, the radial basis function weights and radial basis functions themselves, and the $a_{i_1 l}$ and $A_l$ are the linear coefficients and linear bases. The subscripts $i_1$ and $i_2$ both indicate example indices. Given these bases, the value of each DOF is computed at runtime based on the momentary location, p, in the abstract space. The value of each DOF, $x_j$, at location (p) is, thus, given by:

$$x_j(p) = \sum_{i_1=1}^{N} w_{i_1}(p) x_{i_1 j} \qquad \text{Equation 2}$$

The equation directly above constitutes a weighted sum of all of the examples for each DOF at a location p. This weighted sum provides the shape or motion of the point in abstract space for which an example does not exist. In the past, methods have not calculated a single weight for each example. Rather, individual weights for each of the coefficients that describe a single example were calculated. Where there are many examples, this computational load is quite burdensome and results in a very slow evaluation that is not suitable for runtime animation. Here, however, a single weight is calculated for each example and then applied to the coefficients that define that example. The modified examples are then combined to provide the resultant shape or motion. This approach is advantageous in that it is much faster and is readily suited for runtime animation. Examples of experimental results are given below that demonstrate how the inventive systems and methods improve on past techniques.

The linear function in the above approach provides an overall approximation to the space defined by the examples, and permits extrapolation outside the convex hull of the locations of the examples, as will be understood by those of skill in the art. The radial bases locally adjust the solution to exactly interpolate the examples. The linear approximation and the radial bases are discussed below in more detail.

Simple One Dimensional Example

Before exploring in detail the derivation of the cardinal basis, a simple one dimensional example is given to assist the reader in envisioning the derivation that is described below.

Figure 6:
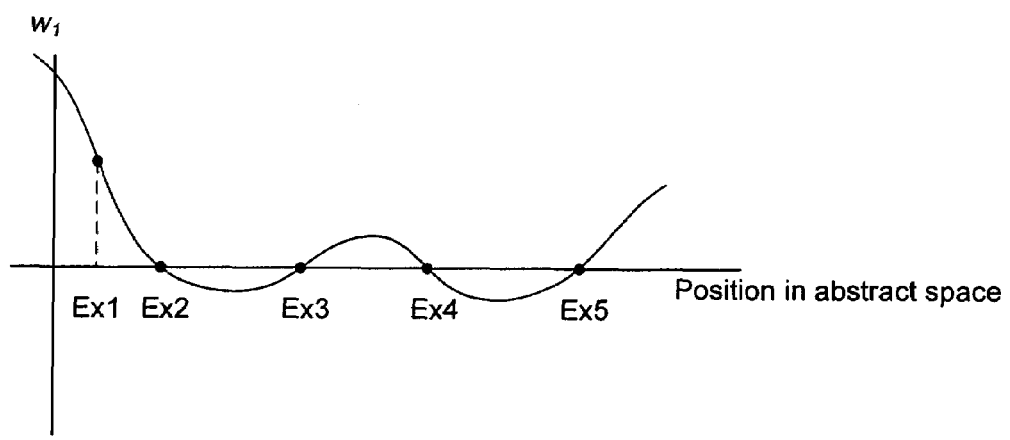
FIG. 6 is an illustration that is useful in understanding some of the concepts behind the inventive interpolation methods of the described embodiments.

Consider FIG. 6 which is a graph of a function where the x-axis represents a continuum of all of the possible positions in abstract space and the y axis represents the value of a weight $w_1$. Consider also that there are five examples (Ex 1-Ex 5) that have been defined such that, for any point in abstract space we wish to derive a set of weights ($w_1$-$w_5$) such that a combination of the weights yields a blended new example that is a realistic representation of any point in the abstract space. The goal of the derivation of the cardinal basis is that the basis function or weight has a value of 1 at the example location and 0 at all other example locations.

Here, notice that the x axis is labeled with five points (Ex 1, Ex 2, Ex 3, Ex 4, and Ex 5). These points constitute the five defined example locations in the abstract space. Notice that the weight value w, for each of these points is 1 for example 1 (Ex 1) and 0 for all of the other examples. A point of interest can be envisioned as sliding back and forth along the x axis and as it does so, its weight coefficient $w_1$ will change in accordance with the function that is defined for $w_1$. With respect to this function, we know that it will have a value of 1 at the point that corresponds to Example 1 and will be 0 elsewhere. What we do not know, however, is the shape of the function at the places between the points that correspond to the examples. This is something that is derived using Equation 1 above.

Equation 1 is essentially an equation that represents a sum of two different parts—a radial basis part (the term on the left side of the equation) and a linear part (the term on the right side of the equation). The weight function for an example at some point p is equal to the summed weighted radial basis functions and the summed linear basis. The linear basis is essentially a plane equation for a plane in the abstract space. For a 4-dimensional space, the equation would be a hyperplane, 3-dimensional space, the equation would be a plane, for a 2-dimensional space, the equation would be a line.

In the discussion just below, the section entitled "Linear Approximation" describes characteristics of the linear portion of equation 1 and the section entitled "Radial Basis" describes characteristics of the radial basis portion of equation 1.

Linear Approximation

In the illustrated example, we first would like to form the best (in the least squares sense) linear approximation for each DOF based on the examples given for that DOF. In other words, we would like to find the hyperplane through the abstract space that comes closest to approximating the example values of that DOF. This defines M separate least squares problems, one for each DOF variable. However, since each example places all variables at a single location, p, we can instead determine a set of N hyperplanes, one for each example, that form a basis for the M hyperplanes. The basis hyperplanes are derived by fitting a least squares hyperplane to the case where one example has a value of 1 and the rest have a value of 0.

Consider the following:

$$p_h a = F,$$

where $p_h$ is a matrix of homogeneous points in the abstract space (i.e., each row is a point location followed by a 1), a are the unknown linear coefficients, and F is a Fit matrix expressing the values we would like the linear approximation to fit. In this case, F is simply the identity matrix since we are constructing a cardinal basis. Later, F will take on a slightly different structure as we discuss reparameterization of the abstract space (see "Reparameterization" section below).

Figure 7:
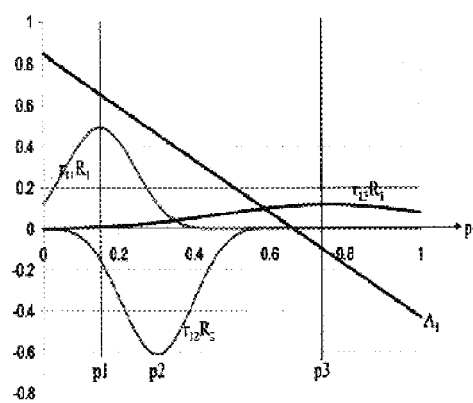
FIG. 7 is a graph that illustrates linear and radial basis portions of a cardinal basis function in accordance with an example that is given.

FIG. 7 shows the linear approximation $A_1$, and three exemplary radial basis functions associated with three different examples for a simple one-dimensional abstract space. The three examples are located at p=0.15, 0.30, 0.75. The straight line labeled $A_1$ is the line that fits best through (0.15, 1), (0.30, 0), (0.75, 0). A "best fit" hyperplane for any particular DOF could then be evaluated by simply scaling the bases by the DOF values and summing.

In the FIG. 7 example, the $R_x$ terms represent the basic shape of the radial basis function. The lowercase "r" associated with each linear basis function represents an amount by which the basis function is scaled in the vertical direction. The width of the basis functions, in this example, is implied by the distance to the nearest other example. For instance, $p_1$ and $p_2$ are close to one another and constitute the closest examples relative to the other. In this particular example, the width of the radial parts of the function is four times the distance to the nearest example. Hence, the width of $p_1$ and $p_2$ are the same, only shifted relative to one another. The width for example $p_3$ is much larger because it is further away from its nearest example ($p_2$). FIG. 7 simply illustrates an example of equation 1 above.

Radial Basis

Radial basis interpolation is known and is discussed in Micchelli, *Interpolation of scattered data: Distance matrices and conditionally positive definite functions*, Constructive Approximation 2 (1986), and in a survey article Powell, *Radial basis functions for multivariable interpolation: A review*, Algorithms for Approximation, J. C. Mason and M. G. Cox, Eds. Oxford University Press, Oxford UK, 1987, pps.

143-167. Radial basis functions have been used in computer graphics for image warping as described in Ruprecht et al., *Image warping with scattered data interpolation*, IEEE Computer Graphics And Applications 15, 2 (March 1995), 37-43; Arad et al., *Image warping by radial basis functions: Applications to facial expressions*, Computer Vision, Graphics, and Image Processing 56, 2 (March 1994), 161-172; and for 3D interpolation as described in Turk et al., *Shape transformation using variational implicit functions*, Computer Graphics (August 1999), pps. 335-342 (Proceedings of SIGGRAPH 1999).

Given the linear approximation described above, there still remain residuals between the example values $x_{ij}$ and the scaled and summed hyperplanes. To account for the residuals, one solution might be to associate a radial basis with each DOF, as described in Rose et al mentioned above. Instead, we proceed as before and use the radial bases to account for the residuals in the cardinal bases. The residuals in the cardinal bases are given by:

$$q_{i_1 i_2} = \delta_{i_1 i_2} - \sum_{l=1}^{D} a_{i_2 l} A_l(p_{i_1}), \text{ where } \delta_{ij} = \begin{Bmatrix} 1 \text{ when } & i = j \\ 0 & \text{otherwise} \end{Bmatrix}$$

To account for these residuals, we associate N radial basis functions with each example. Since there are N examples, we, thus, need $N^2$ radial basis functions. We solve for the weights of each radial bases, $r_{i_2 i_1}$, to account for the residuals such that, when the weighted radial bases are summed with the hyperplanes, they complete the cardinal bases.

This leaves the issue of choosing the specific shape of the radial bases and determining the radial coefficients. Radial basis functions have the form:

$$R_i(d_i(p))$$

where $R_i$ is the radial basis associated with $X_i$ and $d_i(p)$ is a measure of the distance between p and $p_i$, most often the Euclidean norm $\|p - p_i\|$. There are a number of choices for this basis. Rose et al., referenced above, chose a basis with a cross section of a cubic B-spline centered on the example, and with radius twice the Euclidean distance to the nearest other example. Turk et al., referenced above, selected the basis:

$$R(d) = d^2 \log(|d|)$$

as this generates the smoothest (thin plate) interpolations. In the described embodiment, both bases were tried. Bases with the B-spline cross-section were found to have compact support, thus, outside their support, the cardinal bases are simply equal to the linear approximation. They therefore extrapolate better than the smoother, but not compact, radial basis functions used by Turk et al. Accordingly, we chose to use the B-spline bases for this extrapolation property.

The radial bases weights, $r_{i_2 i_1}$, can now be found by solving the matrix system:

$$Qr = q$$

where r is an N×N matrix of the unknown radial bases weights and is defined by the radial bases such that, $Q_{i_1 i_2} = R_{i_2}(p_{i_1})$ the value of the unscaled radial basis function centered on example $i_2$ at the location of example $i_1$. The diagonal terms are all ⅔ since this is the value of the generic cubic B-spline at its center. Many of the off diagonal terms are zero since the B-spline cross-sections drop to zero at twice the distance to the nearest example.

Referring back to FIG. 7, three radial basis functions are seen to be associated with the first of the three examples. If these three radial basis functions are summed with the linear approximation, we get the first cardinal basis, the line labeled $w_1$ in FIG. 8. Note that the first cardinal basis passes through 1 at the location of the first example, and is 0 at the other example locations. The same is true for the other two cardinal bases $w_2$ and $w_3$.

Figure 8:
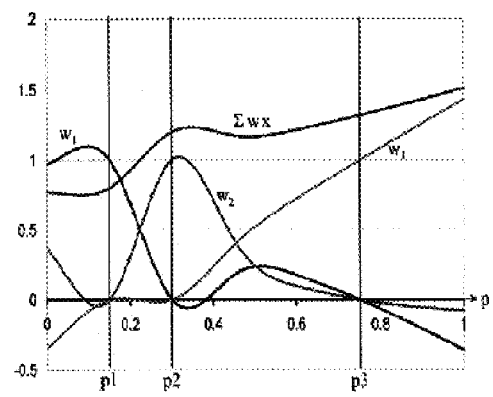
FIG. 8 is a graph that illustrates cardinal basis functions and a scaled sum function for a particular degree of freedom in accordance with the FIG. 7 example.

Given the solutions for the radial basis weights, we now have all the values needed to evaluate equations 1 and 2 at runtime. The line designated Σwx in FIG. 8 is simply the three cardinal bases scaled by the example values and summed as in equation 2.

Shape and Verb Runtime System

At runtime, an application selects a point of interest in the abstract space. This point may move continuously from moment to moment, if for instance, a character's mood changes or the character begins to walk up or downhill. The shape and verb runtime system 220 (FIG. 2) takes this point and generates an interpolated form or motion and delivers it to the application for display.

Complexity Issues

The runtime complexity of the formulation in equations 1 and 2 is $$MN + N(N+S) = MN + N^2 + NS$$

where M is the number of DOF variables, N is the number of examples, and S is the dimension plus one of the abstract space. In Rose et al., referenced above, there was a separate linear hyperplane and radial basis per DOF (approximately 1200 B-spline coefficients in their walking verb). The complexity in their formulation is given by:

$$M(N+S) = MN + MS$$

In our formulation above there is only one set of linear bases and one set of radial bases per example. The efficiency is gained due to the fact that there are many fewer examples than DOF variables. For instance, if M=1200, N=10, and S=6, then the comparison is $MN+N^2+NS$=12,160 vs. $MN+MS+N^2$=19,200. Due to some additional constants, the efficiencies are actually a bit better. We have implemented both Rose et al.'s formulation and the one presented here and found an approximate increase in speed at a factor of about 2 in most cases.

Reparameterization and Modification of Shapes and Verbs

Figure 9:
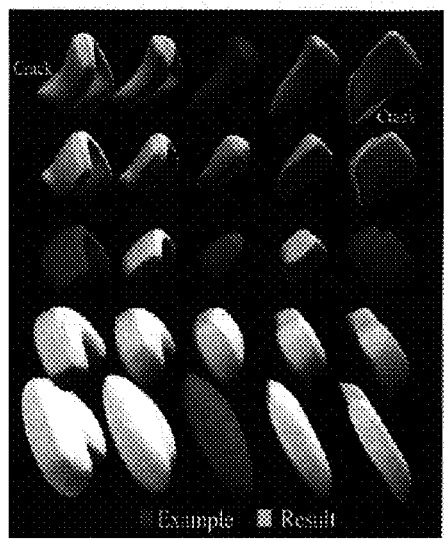
FIG. 9 is a color picture that describes exploration of abstract space that can reveal problems involved with the described interpolation.

Once a shape or verb has been generated, the abstract space can be quickly explored to see the interpolated forms and motions. It is possible that some of the regions in this space are not entirely to the designer's liking. For instance, FIG. 9 shows a 2D space of interpolations of a simple three-dimensional shape. Blue forms indicate examples and grey forms are the result of the shape and verb runtime system 220 (FIG. 2).

Problem regions can be seen in each of the two upper corners. Both corners exhibit cracks due to surface interpenetration. Another type of problem can occur when an interpolation changes more quickly than desired in one region and more slowly than desired in a neighboring region. For instance, at the point in the abstract space that is half way between a happy walk and a sad walk, the character may appear to be more sad than happy, rather than neutral.

Two methods are typically available to modify the results produced by the shape and verb generator 204 (FIG. 2). In one method, a new example can be inserted at the problem location and a new verb or shape generated. A quick way to bootstrap this process is to use the undesirable results at the problem location as a "starting point", fix up the offending vertices or motion details, and reinsert this into the abstract space as a new example. In the second method, the designer first selects an acceptable interpolated form or motion from a location in the abstract space near the problem region. Next, the designer moves this form to a location in the problem region. This relocated form will be treated exactly the same as an example. This relocated form is referred to as a "pseudo-example" in this document.

Going back to the problem with the walk verb described above, a neutral walk cycle found elsewhere in the abstract space may be moved to the halfway point between happy and sad walks.

The place from which the pseudo-example is taken will be point p. We denote the new position to which it is moved to as $\tilde{p}$. The pseudo-example is not a "true" example as it is a linear sum of other examples. However, it acts like an example in terms of changing the shape of the radial basis functions. In essence, this method reparameterizes the abstract space. Reparameterization is very effective in producing shapes of linked figures, as we demonstrate later with a human arm shape.

Figure 10:
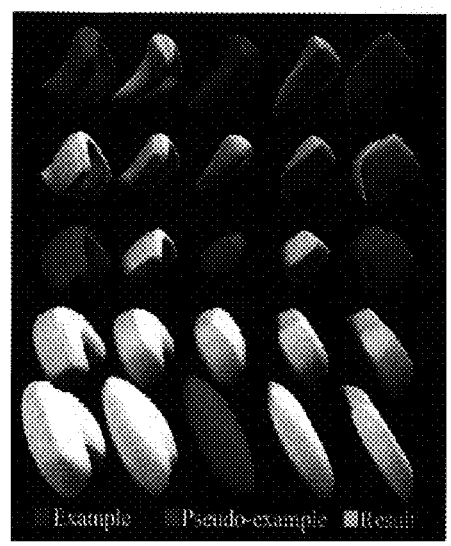
FIG. 10 is a color picture that describes pseudo-examples that can be used to re-parameterize abstract space to address the problems revealed and illustrated in FIG. 9.

FIG. 10 shows this technique applied to the 2D space of 3D forms. The space has been reparameterized with two pseudo-examples shown in red, with indications from which the pseudo-examples were drawn.

Creating the reparameterized verb or shape proceeds much as before. We introduce a few new notations, however, before we formalize the reparameterization approach. We have already mentioned $\tilde{p}$, the new location of the pseudo-examples. $\tilde{p}$ also includes the real example locations during reparameterization. We, furthermore, use a tilde to denote the new radial basis weights, $\tilde{r}$, the new linear coefficients $\tilde{a}$, and the new cardinal bases $\tilde{w}$. We also denote the total number of real and pseudo-examples as $\tilde{N}$.

As before, the form or motion at any point in the abstract space is:

$$x_j(p) = \sum_{i_1=1}^{N} \tilde{w}_{i_1}(p) x_{i_1 j}$$

Equation 3

Note that the interpolated form or motion still only includes a sum over the real examples. In other words, there are still only N cardinal bases after the reparameterization. The pseudo-examples reshape these N bases from w to $\tilde{w}$.

$$\tilde{w}_{i_1}(p) = \sum_{i_2=1}^{\tilde{N}} \tilde{r}_{i_2 i_1} R_{i_2}(p) + \sum_{l=0}^{D} \tilde{a}_{i_1 l} A_l(p)$$

Equation 4

Also as before $\tilde{p}_{i_2} \tilde{a} = \mathbb{F}$. However, $\mathbb{F}$ is no longer an identity matrix. It now has $\tilde{N}$ rows and N columns. Assuming the new pseudo-examples are all located at the bottom of the matrix, the top N×N square is still an identity. The lower $\tilde{N}$–N rows are the values of the original cardinal bases w at the location where the pseudo-examples were taken from (see equation 4). That is, in each row, the Fit matrix contains the desired values of the N cardinal bases, now at $\tilde{N}$ locations. These are 1 or 0 for the real example locations and the original cardinal weights for the pseudo-examples.

The radial portion of the cardinal basis construction proceeds similarly. The residuals are now:

$$\tilde{q}_{i_1 i_2} = \tilde{F}_{i_1 i_2} - \sum_{l=0}^{D} \tilde{a}_{i_2 l} A_l(p_{i_1})$$

Note that instead of the Kronecker delta, we now have the values from $\mathbb{F}$.

The coefficients, $\tilde{r}_{i_2 i_1}$, are now found by solving the matrix system, $$Q\tilde{r}=\tilde{q}$$

As before, $Q_{i_1 i_2}$ has terms equal to $R_{i_2}(\tilde{p}_{i_1})$, however, these terms now include the new pseudo-example locations. As a consequence, the radii of the radial basis functions may change.

Figure 11:
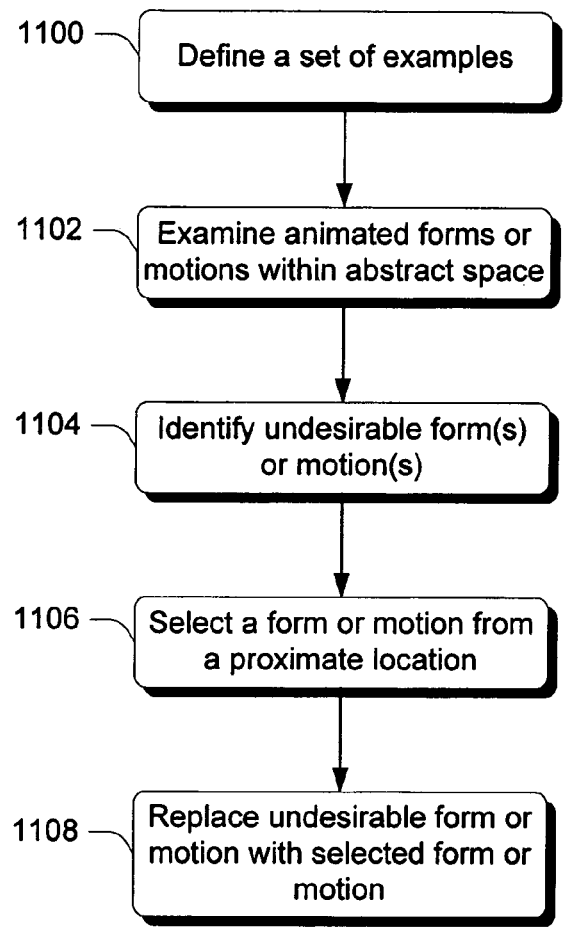
FIG. 11 is a flow diagram that describes steps in a method in accordance with the described embodiment.

FIG. 11 is a flow diagram that describes steps in a reparameterization method in accordance with the described embodiment. Step 1100 defines a set of examples that pertain to a form or motion that is to be animated. The examples are provided relative to a multi-dimensional abstract space. In the illustrated example, this step can be implemented by a animation designer using a set of software tools to design, for instance, example objects or character motions. Step 1102 examines a plurality of forms or motions that are animated with the abstract space from the defined set of examples. In the illustrated and described embodiment, the forms or motions can be animated from the examples using the techniques described above. Step 1104 then identifies at least one form or motion that is undesirable. This step can be manually performed, e.g. by the designer physically examining the animated forms or motions, or it can be performed by software that looks for undesirable forms or motions. An example of an undesirable form or motion is one that, for example, exhibits undesirable characteristics such as surface interpenetration due to interpolation issues. Once the undesirable forms or motions are identified, step 1106 selects a form or motion from a location within the abstract space that is proximate a location that corresponds to the undesirable form or motion. This step can be implemented by a designer actually physically selecting the form or motion. Alternately, it can be performed by software. Once the form or motion is selected, step 1108 replaces the undesirable form or motion with the selected form or motion to provide a pseudo-example that constitutes a linear sum of the original examples. Processing as far as subsequent rendering operations can take place as described above.

Shapes and Skeletons

Animated characters are often represented as an articulated skeleton of links connected by joints. Geometry is associated with each link and moves with the link as the joints are rotated. If the geometry associated with the links is represented as rigid bodies, these parts of the character will separate and interpenetrate when a joint is rotated. A standard way to create a continuous skinned model is to smoothly blend the joint transforms associated with each link of the character. This is supported in current graphics hardware, making it an attractive technique. This simple method exhibits some problems, however.

We use an arm bending at the elbow to discuss the problems associated with transform blending and to demonstrate how we can overcome these difficulties in the context of shape blending.

To perform the simple transform blending, a blending weight α is assigned to each vertex. For instance, for the elbow bending, vertices sufficiently below the elbow would have weight α=1, and those sufficiently above, α=0. Those vertices near the elbow would have α values between 0 and 1, as will be understood by those of skill in the art.

We denote the transformation matrix for the upper arm as $T_0$, and the transformation for the lower arm as $T_1$. We use superscripts to denote the amount of rotation of the joint. Thus, as the elbow rotates, we say that $T_1$ changes from $T_1^0$ when the elbow is straight to $T_1^1$ at a bent position. In between, the transform is $T_1^\beta$ for a bending amount β. We refer to the position of the arm when $T_1=T_1^0$ as the rest position.

Figure 12:
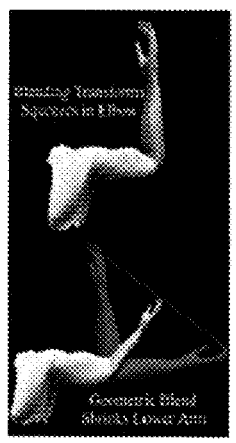
FIG. 12 is a color picture that illustrates simple transformation blending that leads to or exhibits shrinking about the joints.

We denote the position of a vertex as $x_0$ when the transformation of the joint is $T_1^0$. The simple transform blending is defined as:

$$x = \alpha T_1^\beta x_0 + (1-\alpha) T_0 x_0$$

where α is the blending weight assigned to that vertex. Unfortunately, linearly summed transformation matrices do not behave as one would like. The result is that the skin appears to shrink near the rotating joint (see FIG. 12). In addition, simple transform blending does not provide a rich set of tools for creating effects such as a muscle bulging as the elbow bends.

In the illustrated and described embodiment, we provide solutions to both problems through the use of our inventive shape blending techniques. To do this, the designer first creates examples of a straight arm, $X_{\beta=0}$, and a bent arm, $X_{\beta=1}$, for, say, a 90-degree bend (FIG. 11). The bent arm includes any muscle bulging or other deformations the designer wants to include. We obviously cannot simply perform a direct geometric blend between these forms because at 45 degrees, the lower arm would have shrunk considerably, since the chord from the fingertip of the bent arm to the fingertip of the straight arm passes nearer to the elbow than an arc would, as will be appreciated by those of skill in the art.

Instead, what we would like is a combination of transform blending and shape blending. Accordingly, we call the vertex on the bent arm, corresponding to $x_0$ on the arm in the rest position, $x^1$. As in the simple blended transforms, we also have a blending weight, α, associated with each vertex. We now seek a second arm in the rest position with a corresponding vertex, $x_0^1$, such that when it is subjected to the simple transform blending at an angle of β=1 it will exactly match the bent arm specified by the designer. Thus, $$x^1 = \alpha T_1^{\beta=1} x_0^1 + (1-\alpha) T_0 x_0^1$$

Figure 13:
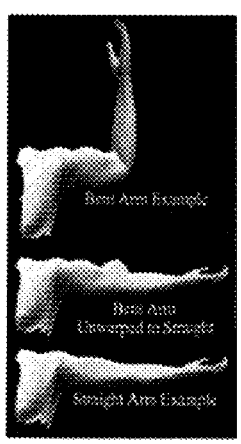
FIG. 13 is a color picture that illustrates example forms that are warped into a cononical pose.

Now we can solve for the vertices of this new arm in the rest position (see FIG. 13):

$$x_0^1 = (\alpha T_1^{\beta=1} + (1-\alpha) T_0)^{-1} x^1 \qquad \text{Equation 5}$$

We can now first perform a geometric blend of the new arm in the rest position with the original arm in the rest position and then transform it. The result is:

$$x_\beta = (\alpha T_1^\beta + (1-\alpha) T_0)(\beta x_0^1 + (1-\beta) x_0) \qquad \text{Equation 6}$$

This geometric blend followed by the blended transform will match the original arm geometry when β=0 and will match the bent arm created by the designer when β=1.

The arm model discussed above contains only two example forms, the arm in the rest position and the bent arm. It will be appreciated, however, that all of the techniques discussed above can be used to perform a multi-way blend of the articulated geometry. First, all example forms are untransformed to the rest position via equation 5. Then the multi-way shape blending is applied to the untransformed forms. Finally, the blending result is transformed in the normal way. In other words, the interpolation of the forms in the rest position simply replaces the latter half of equation 6.

Figure 14:
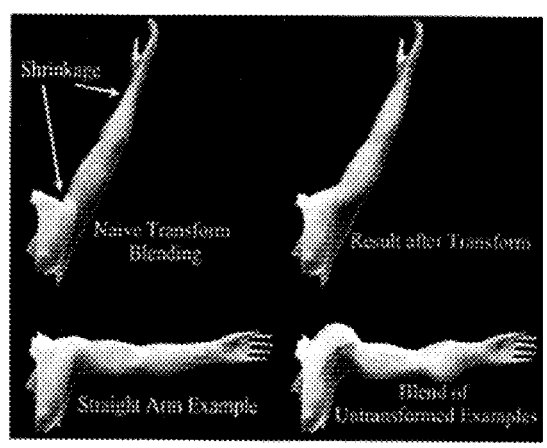
FIG. 14 is a color picture that illustrates naive transform blending versus interpolated blending.

FIG. 14 shows the straight arm example one, of 6 examples in this shape. The results above the straight arm are the result of naively blending transforms on this one example. On the bottom right is a blend of the 6 examples untransformed to the rest position. Finally, this strange blended form is pushed through the blended transformation to the give the result shown in the upper right.

Figure 15:
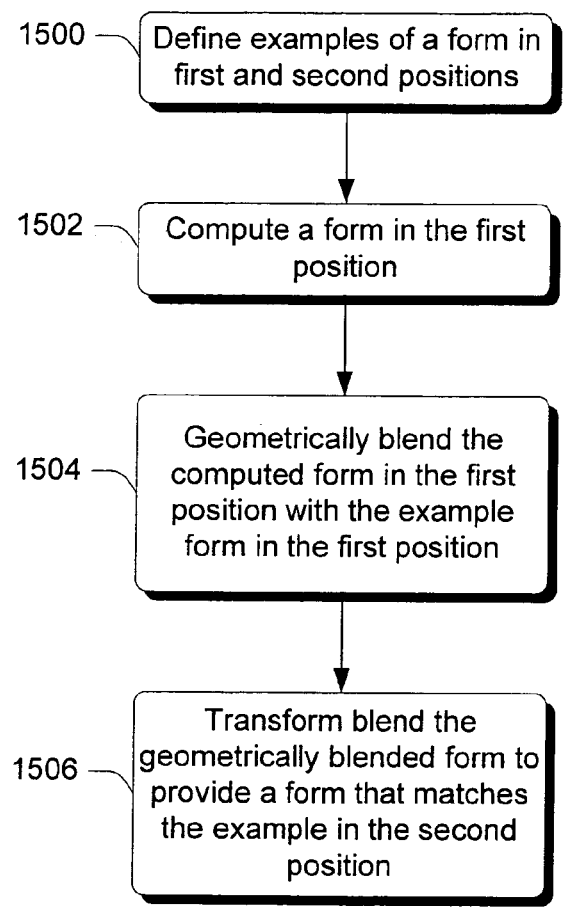
FIG. 15 is a flow diagram that describes steps in a method in accordance with the described embodiment.

FIG. 15 is a flow diagram that describes step in a animation method in accordance with the described embodiment. Step 1500 defines examples forms in different positions. In the illustrated, a first example form is defined in a first position and a second example form is defined in a second position. Step 1502 then computes a form in the first position such that when the computed form is subjected to a transform blending operation that places the computed form in the second position, it will match the second example form. Step 1504 geometrically blends the computed form in the first position with the first example form in the first position to provide a geometrically blended form in the first position. Specific examples of this are given above. Step 1506 then transform blends the geometrically blended form to provide a form that matches the second example form in the second position.

Results

We have applied the paradigm described above to a number of shapes and linked-figure animations. We will discuss two of each. All performance statistics measure raw interpolation speeds and do not include time to render. All timings were gathered on a 450 Mhz Pentium II, Dell Precision 610-machine.

Simple Shapes

The shape demonstrated in FIG. 10 includes 5 example forms, each consisting of 642 vertices and 1280 faces. Blending in this space can be done at 5500 frames per second (fps). One step of Loop subdivision is applied to this mesh and the limit positions and normals are computed. This results in a mesh with 2562 vertices and 5120 faces that is rendered at runtime. A two dimensional abstract space was created with the horizontal axis being "bend" and the vertical being "thickness." The initial space had regions in the upper right and left corners where the blended surface was interpenetrating. This space was reparameterized by adding pseudo-examples near these locations that were not interpenetrating. When real examples were added instead, the blending slowed down to around 4000 fps.

Arm

The arm was created by modifying Viewpoint models inside 3D-Studio/Max. The arm example has an underlying skeleton that has 3 rotational degrees of freedom—one for the shoulder, elbow and wrist. We have a fourth variable for the parameterized arm, gender. The abstract space has 8 real examples (straight arm, shoulder up, shoulder down and elbow bent for male and female models), and 6 pseudo-examples which are mostly placed to smooth out bulges where the shrinking from blended transforms was being overcompensated. These examples have 1335 vertices and 2608 faces each. This dataset can be interpolated at 2074 fps.

Figure 16:
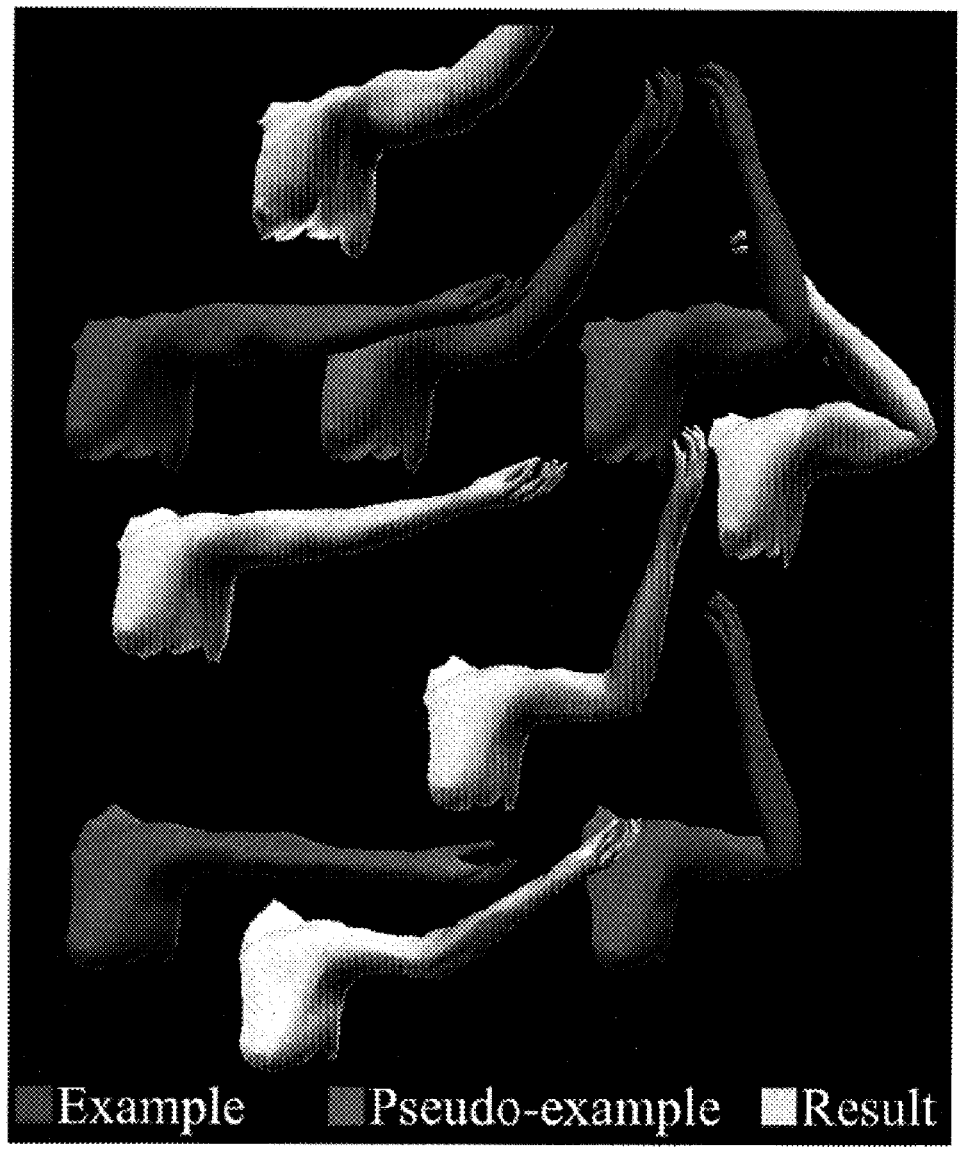
FIG. 16 is a color picture that illustrates examples and pseudo-examples in accordance with the described embodiment.

FIG. 16 is a visualization of a 2D space of arms with 4 real examples and 1 pseudo-example. Elbow bend is parameterized along the horizontal axis and gender along the vertical. Extrapolation can produce some interesting results, as are indicated.

Animation

We constructed parameterized motions, verbs, for two different characters: a human figure named Stan and a robot warrior. While both bipedal, each moves in very different ways.

Stan moves in a humanlike, though often exaggerated, manner, while the robot warrior moves very mechanically. Our technique had no trouble encompassing both forms. Our motion examples were chosen to encompass emotional states such as mopiness, cockiness, fear, anger, and for physical parameters such as damage and surface slope.

Figure 17:
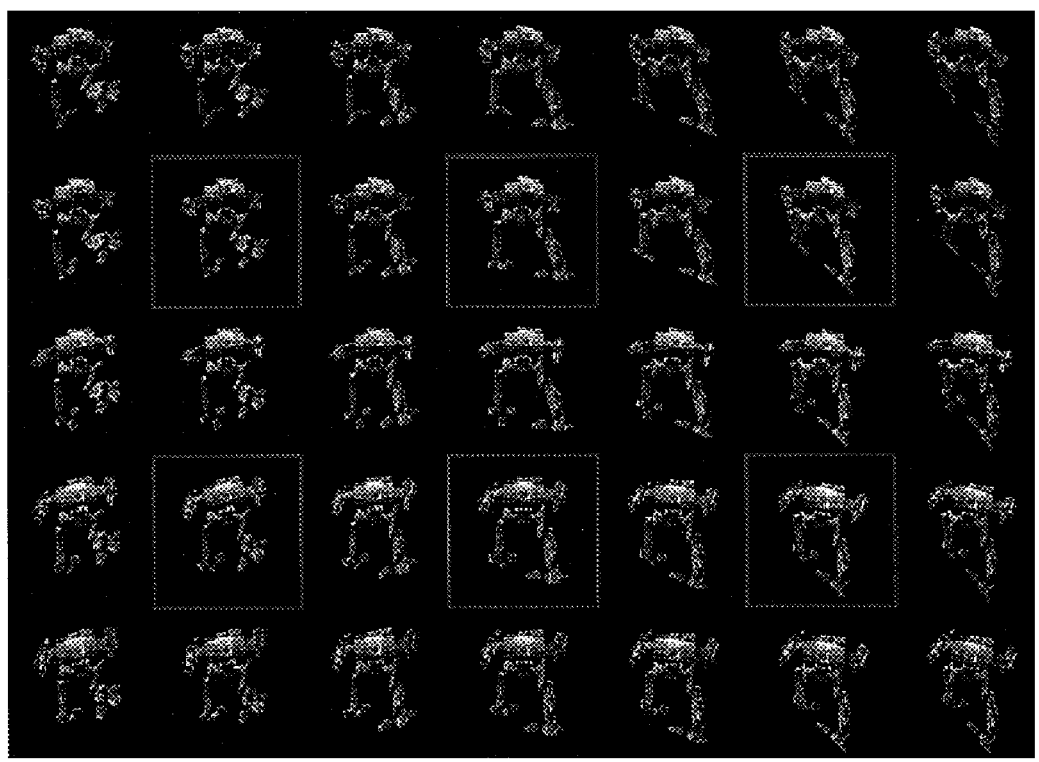
FIG. 17 is a color picture that illustrates exemplary motions in accordance with the described embodiment. In the figure, health increases as y increases and slope of the surface ranges from sloping to left to right.
Figure 18:
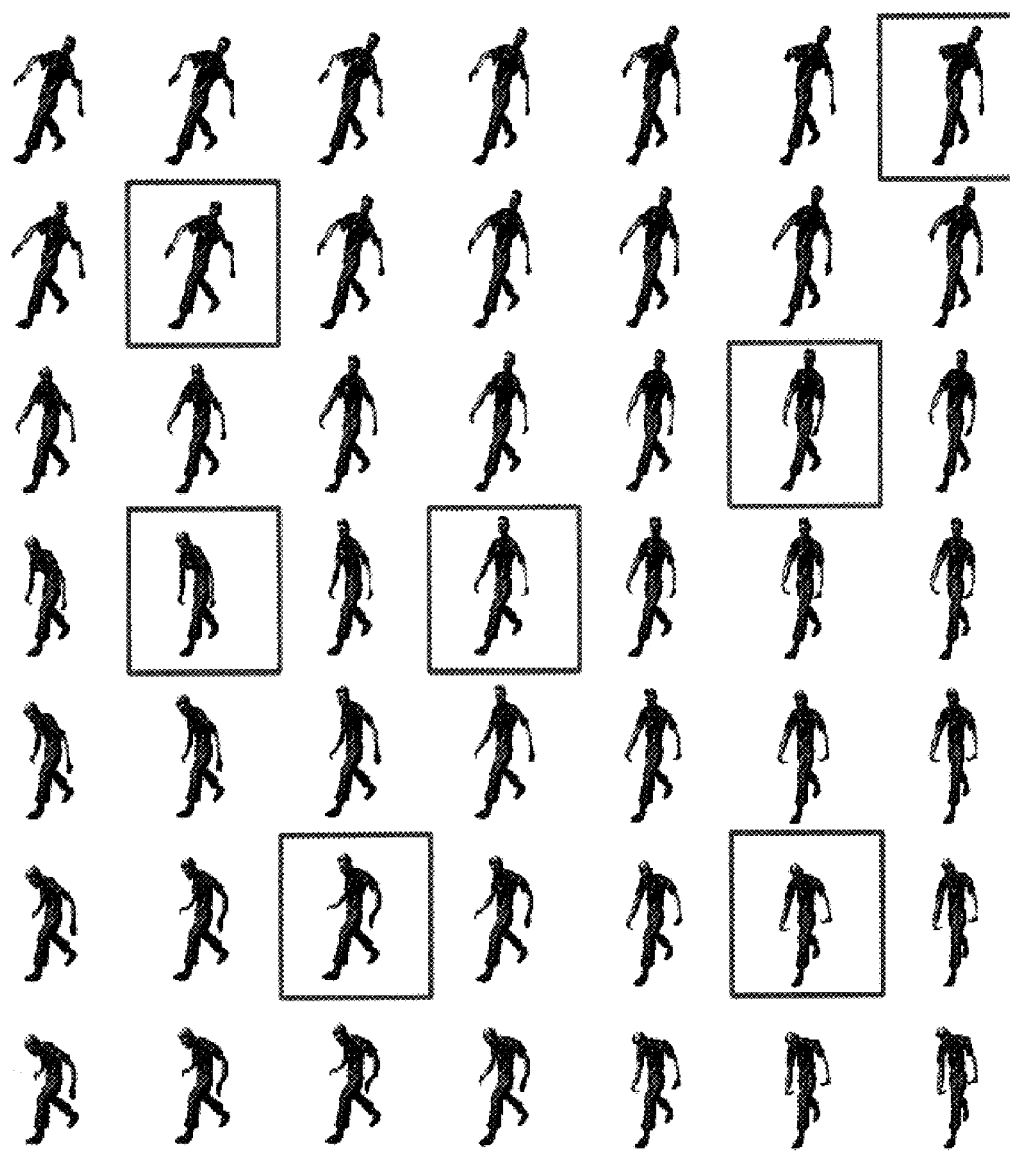
FIG. 18 is a color picture that illustrates exemplary motions in accordance with the described embodiment. In the figure, knowledge increases from left to right and happiness increases from bottom to top.
Figure 19:
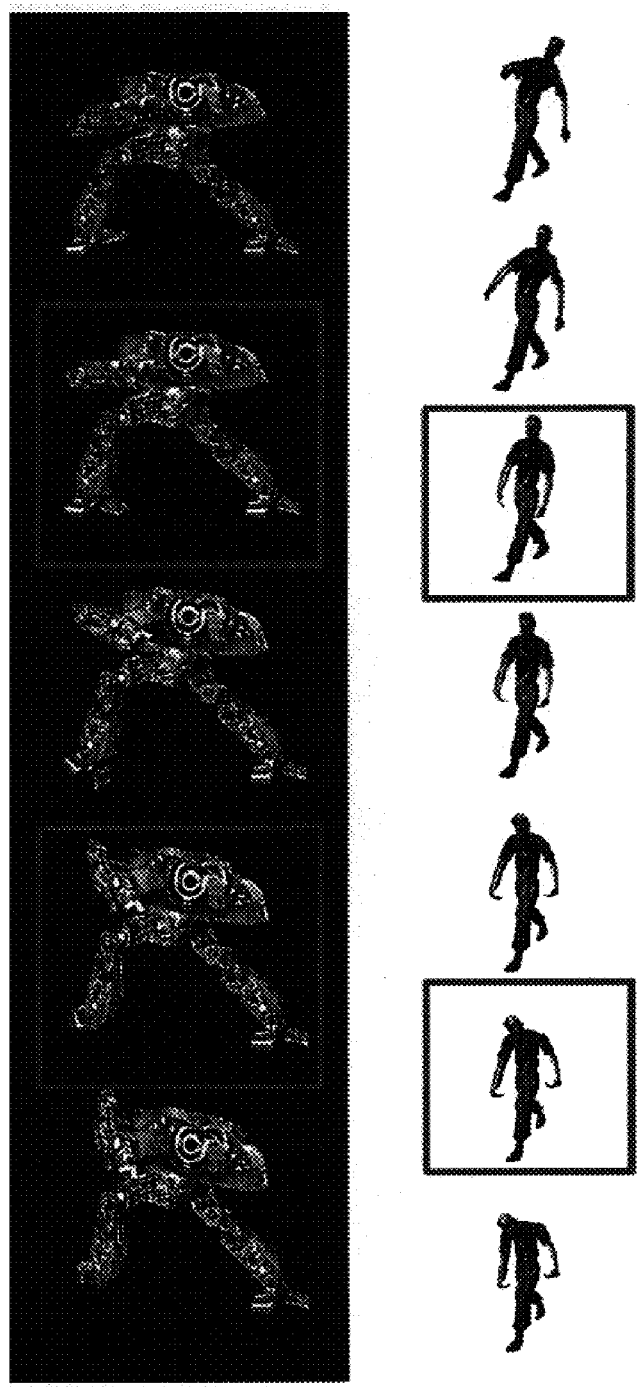
FIG. 19 is a color picture that provides more detail of the characters of FIGS. 17 and 18.

The verbs shown in FIGS. 17-19 were constructed from a mix of motion capture and hand animated source. The motion capture data was gathered optically. The hand-animated source was generated on two popular software animation packages: 3D-Studio/Max for the robot, and Maya for some of Stan's data. This data is applied to a skeleton positioned with a translation at the root and a hierarchy of Euler angle joints internally. A technique similar to one discussed in Bodenheimer, et. al., *The process of motion capture: Dealing with the data*, Proceedings of the Eurographics Workshop on Computer Animation and Simulation (September 1997), pps. 3-18, ensured that the angles remained well-behaved.

Our robot warrior has 60 degrees of freedom. Our robot data exhibits two primary kinds of variation: slope of walking surface and level of damage to the robot. Damage results in limping and slope causes the character to rotate the joints in the leg, foot, and waist, and shift weight to accommodate.

FIG. 17 shows a sampling of the robot walking verb. Green boxed figures are examples. The others are interpolations and extrapolations. The vertical axis shows robot health and the horizontal axis surface slope. FIG. 19 shows the robots in the center column of FIG. 17 rotated to the side to better show the character limping. We constructed a number of robot verbs: powered-down idle, power-up, powered-up idle, power-down, idle-to-walk, walk, and walk-to-idle. These verbs, together with a transitioning mechanism can be combined to form a verb graph such as discussed in Rose, et. al., referenced above. The robot verbs evaluate at 9700 fps in the absence of rendering. Thus, a robot evaluated using verbs can be run at 30 fps with only a 0.3% percent processor budget.

We also constructed a walking verb from a human figure, Stan, with 138 degrees of freedom. We chose 3 emotional axes for this verb which seemed to encompass the gamut of variation present in the data. These were happy-to-sad, knowledgeable-to-clueless, and low-to-high-energy. Our example motions exhibit these subjective characteristics: easy-going, mopey, cocky, goofy, angry, afraid, and neutral. FIG. 18 shows a sampling of our walk along the knowledge and happiness axes. Unlike the robot data, which was designed to fall at regular places in the adverb plane, our Stan motions are less regular. As there are no restrictions upon example placement, we are able to construct verbs with irregular example placement, as shown by the green-boxed figures. Evaluating a pose for Stan is extremely efficient: 3900 fps or a 0.7% processor budget at 30 fps.

Conclusions

Shape and motion interpolation has been shown to be an effective and highly efficient way of altering shape and motion for real-time applications such as computer games. The front-end solution process is also efficient, (a fraction of a second), so a tight coupling between artist, solver, and interpolator provides a new way for an artist to work without fundamentally altering their workflow. With our system, artists can more easily extend their work into the interactive domain.

In the context of skeleton based figures, we are able to combine both shape blending with blended transforms to create a smoothly skinned character. We are able to overcome the limitations of blended transforms, while including the artist's input for how muscles deform as the skeleton moves, and still maintain interactive performance.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A blending method comprising:
    providing a set of examples that pertain to a shape or motion that is to be animated, the examples being placed within a multi-dimensional abstract space, wherein each dimension of the abstract space is defined by at least one of an adjective and an adverb, each adjective and adverb representing a respective axis in the multi-dimensional abstract space;
    selecting a point within the multi-dimensional abstract space that does not coincide with a point that is associated with any of the examples, the selected point corresponding to a new shape or motion within the abstract space;
    linearly approximating a degree of freedom that is associated with the new shape or the motion based upon the set of examples;
    computing a scaled radial basis function for each of the examples by scaling a radial basis function for each example, the scaling comprising evaluating a matrix system to ascertain a plurality of scaling weights, individual weights of which are used to scale the radial basis functions;
    combining the linear approximation and the scaled radial basis functions to provide a cardinal basis function; and
    using the cardinal basis function to render the new shape or motion at the selected point within the multi-dimensional abstract space.

2. The blending method of claim 1, wherein the selecting is performed by an application.

3. The blending method of claim 1, wherein the selecting is performed by a game application.

4. The blending method of claim 1, wherein the selecting is performed at run time.

5. The blending method of claim 1, wherein the computing is performed at run time.

6. The blending method of claim 1, wherein the computing and combining are performed at run time.

7. The blending method of claim 1, wherein the combining comprises:
    defining a cardinal basis for each example; and
    evaluating the cardinal basis for each example relative to the selected point to provide a weight value used to define the new shape or motion at the selected point in the multi-dimensional abstract space.

8. The blending method of claim 7, wherein the cardinal basis comprises:
    a radial basis function portion; and
    another portion that is different from the radial basis function portion.

9. The blending method of claim 8, wherein the another portion is not a radial basis function portion.

10. The blending method of claim 8, wherein the another portion is a linear portion.

11. One or more computer-readable media having computer-readable instructions thereon which, when executed by a computer, implement the method of claim 1.

12. A computerized blending system that is programmed with instructions which, when executed by the system, implement the method of claim 1.

13. A blending method comprising:

linearly approximating a degrees of freedom that are associated with a new form or motion that is to be rendered based upon a plurality of examples that define respective forms or motions within a multi-dimensional abstract space, wherein each dimension of the abstract space is a respective axis defined by at least one of an adjective and an adverb, wherein the linearly approximating is performed for each example;

defining a scaled radial basis function for each of the examples by scaling a radial basis function for each example, the scaling comprising evaluating a matrix system to ascertain a plurality of scaling weights, individual weights of which are used to scale the radial basis functions;

defining cardinal basis functions by combining for each example, the respective linear approximations and scaled radial basis functions; and using the cardinal basis function to render the new form or motion.

14. The blending method of claim 13, wherein the matrix system is configured so that its evaluation yields scaling weights which, when used to scale a corresponding radial basis functions, result in a combination of the radial basis functions and the linear approximation to provide the cardinal basis function.

15. The blending method of claim 13, wherein the radial basis functions are selected from a b-spline family of radial basis functions.

16. The blending method of claim 13, wherein the linearly approximating comprises approximating the degree of freedom with a least squares linear approximation.

17. One or more computer-readable media having computer-readable instructions thereon which, when executed by a computer, implement the method of claim 13.

18. The blending method of claim 13, wherein a new example is inserted within the multi-dimensional abstract space and a new form or motion is generated.

* * * * *

UNITED STATES PATENT AND TRADEMARK OFFICE
CERTIFICATE OF CORRECTION

| | | |
|---|---|---|
| PATENT NO. | : 7,420,564 B2 | Page 1 of 1 |
| APPLICATION NO. | : 11/118687 | |
| DATED | : September 2, 2008 | |
| INVENTOR(S) | : Michael F. Cohen et al. | |

It is certified that error appears in the above-identified patent and that said Letters Patent is hereby corrected as shown below:

In column 20, line 4, in Claim 13, delete "function" and insert -- functions --, therefor.

Signed and Sealed this
Twenty-sixth Day of April, 2011

David J. Kappos
*Director of the United States Patent and Trademark Office*